United States Patent
Olpak et al.

(10) Patent No.: US 8,144,022 B2
(45) Date of Patent: Mar. 27, 2012

(54) HEAT SENSITIVE SENSOR FOR FLEXIBLE WAVEGUIDES

(75) Inventors: Tamir Olpak, Petah Tikvah (IL); Vitaly Burkatovsky, Rishon Le Zion (IL)

(73) Assignee: Eastman Kodak Company, NJ (US)

( * ) Notice: Subject to any disclaimer, the term of this patent is extended or adjusted under 35 U.S.C. 154(b) by 270 days.

(21) Appl. No.: 12/566,906

(22) Filed: Sep. 25, 2009

(65) Prior Publication Data

US 2011/0074588 A1   Mar. 31, 2011

(51) Int. Cl.
*G08B 21/00* (2006.01)

(52) U.S. Cl. .......................... 340/606; 340/608; 340/611

(58) Field of Classification Search .................. 340/606, 340/607, 608, 610, 611, 626; 210/151; 250/227.14; 264/558, 563, 571
See application file for complete search history.

(56) References Cited

U.S. PATENT DOCUMENTS

| | | | | |
|---|---|---|---|---|
| 4,241,729 A * | 12/1980 | Aoshiro | ............... | 600/133 |
| 5,665,301 A * | 9/1997 | Alanko | ............... | 264/571 |
| 6,733,718 B2 * | 5/2004 | Bourget et al. | ......... | 264/558 |
| 6,881,948 B2 * | 4/2005 | Dammann | .......... | 250/227.14 |
| 2009/0207387 A1 | 8/2009 | Eyal et al. | | |
| 2010/0300947 A1 * | 12/2010 | Sun | ............... | 210/151 |

FOREIGN PATENT DOCUMENTS

| | | | |
|---|---|---|---|
| CN | 101254410 A | * | 9/2008 |
| DE | 3911095 A1 | * | 10/1990 |
| WO | WO 2006094435 A1 | * | 9/2006 |
| WO | WO 2007073080 A1 | * | 6/2007 |

* cited by examiner

*Primary Examiner* — Van T. Trieu
(74) *Attorney, Agent, or Firm* — Nelson Adrian Blish

(57) ABSTRACT

An apparatus designed to alert on an abnormal condition inside of a fiber bundle (116). The apparatus includes an air pipe (112) configured inside of the fiber bundle, an air compression element adapted to apply air into the air pipe, at least one sensor (124, 128, 132, 136, 148) configured in combination with the air pipe wherein at least one sensor is coupled to at least one location on the air pipe. An alerting element (172, 308) is configured to notify on an abnormal measurements of at least one sensor.

11 Claims, 5 Drawing Sheets

HEAT SENSITIVE SENSOR FOR FLEXIBLE WAVEGUIDES

CROSS REFERENCE TO RELATED APPLICATIONS

Reference is made to commonly-assigned U.S. patent application Ser. No. 12/032,716, now U.S. Publication No. 2009/0207387, filed Feb. 18, 2008, entitled A FIBER OPTIC IMAGING APPARATUS, by Eyal et al., the disclosure of which is incorporated herein.

FIELD OF THE INVENTION

The present invention relates in general to a safety device for optical cables, and in particular to sensors configured to alert on excess heat in a fiber optic bundle.

BACKGROUND OF THE INVENTION

There are a number of mechanical electrical devices that use optical fibers cables or electrical cables, collectively referred to as cables, wherein flexibility is especially important. In some applications, these cables are subjected to repetitive bending operations that may, over time, cause damage to the cables. This damage may cause electrical shorting, in the case of electrical cables, or melting of the cables due to light leakage and heat buildup, in the case of optical fiber. Both of these scenarios may cause safety issues and may result in expensive repairs.

Computer-to-plate (CTP) machines present a good example of this type of problem. In a CTP machine, a bundle of optical fiber is attached to an imaging head, which is moved back and forth numerous times along a surface of a rotating drum to create an image on media attached to the drum. For the purpose of heat excess detection, along high power electric transmission cable assemblies, linear heat detectors such as from Protectowire (http://protectowire.com/) are used. Unfortunately such sensors can not be used in some cable trays due to the limited structural flexibility.

It is therefore the object of the present invention to provide a heat sensors for flexible waveguides. It is also an object of the present invention to provide an alert module and an interlock module that are activated by a signal detected by the heat sensors and heat detectors.

SUMMARY OF THE INVENTION

Briefly, according to one aspect of the present invention an apparatus for alerting on an abnormal condition in a fiber bundle including, an air pipe inside the fiber bundle, an air compression adapted to apply air into the air pipe, at least one sensor in combination with the air pipe and coupled to at least one location on the air pipe. An alerting element is configured to alarm on an abnormal measurements of at least one sensor.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

This invention presents methods and apparatus, for detecting excess heat within multi-cable configurations. For example, when high power fiber coupled lasers are deployed, laser safety measures should be introduced to avoid hazardous states.

According to the present invention, longitudinal sensor elements will alert an operator of heat excess within and along a cable, such as a fiber optic bundle, electric cables pipes, and similar cable configurations. For example, a fiber optic bundle is usually made of glass fibers configured to transmit light emitted from high power lasers. An excess of heat generated within and along a bundle of fibers may be caused by a break or a cut along one or more locations of the glass fibers which form the bundle.

For purposes of illustration, a typical imaging device may use high power, fiber coupled laser diodes in its optical heads. The total optical power delivered by such a device may reach, roughly 2000 watts. The usage of power levels of this magnitude may increase the need for caution so that hazardous situations do not occur. The cables should be carefully inspected to prevent light leakage or cable meltdown.

Figure 1:
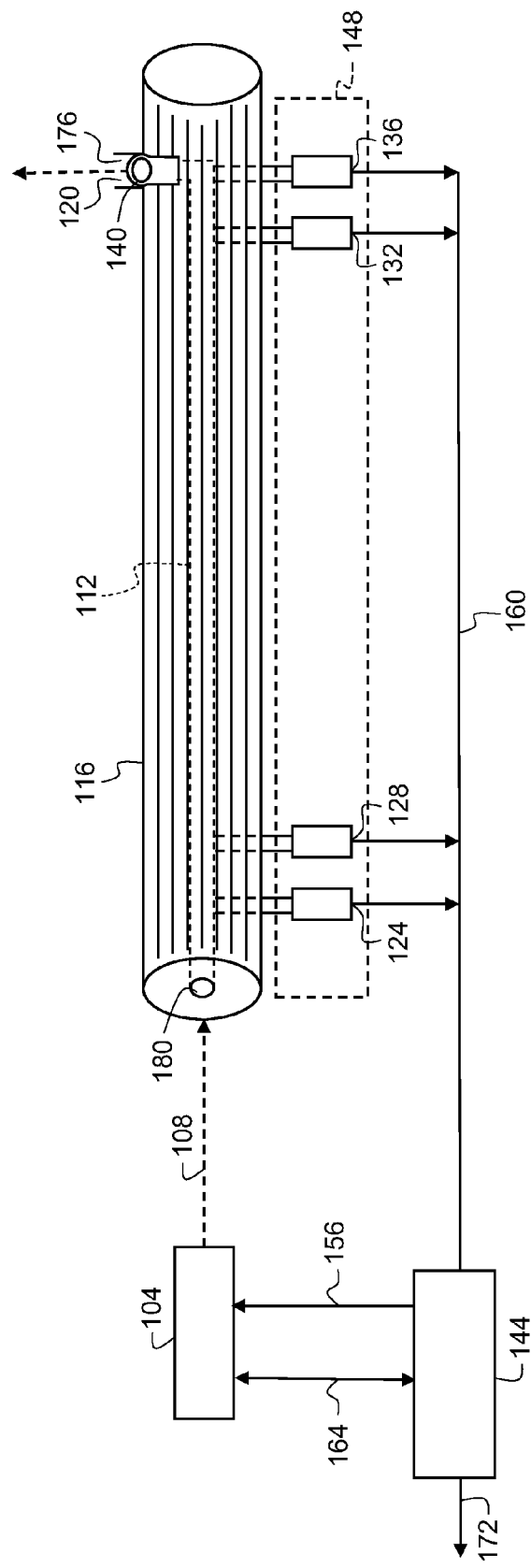
FIG. 1 is an illustration of an air pipe inside a fiber bundle with air pressure and air flow sensors.

In one embodiment of the invention, such a sensor is shown in FIG. 1. An air pipe 112 is incorporated in the fiber bundle 116. The air pipe 112 is constructed from material with predefined melting temperature, suitable for fiber bundle 116 robust operation. An air pressure source 104 is adapted to apply air flow 108 into air pipe 112 during operation of the fiber bundle 116. The applied air flows in the air pipe 112 and is released from the air pipe 112 at the air flow outlet 120. The air flow outlet 120 is equipped with a small diameter air flow opening 176. The opening diameter is optionally regulated by air flow regulator 140.

Sensor element 148 is attached to fiber bundle 116. Sensor element may be configured from various types of sensors such as pressure and air flow sensors or a combination thereof. The sensors can be positioned at the inlet and/or at the outlet of bundle 116, and/or along fiber bundle 116.

FIG. 1 shows sensor element 148 which is comprised of two pairs of sensors. Two sensors are attached to the inlet of air pipe 112, an inlet pressure sensor 124 and an inlet air flow sensor 128. In addition, another two sensors are attached to the outlet of air pipe 112, an outlet pressure sensor 132 and an outlet air flow sensor 136.

Controller 144 controls air pressure source 104, through control/status line 164. Controller 144 also sends a test validation signal 156 from time to time, to inspect sensor elements 148 as well as the state of air pipe opening 176. The data from sensor element 148 is collected by controller 144 via sensor data collection line 160, and is compared to the expected values that should have been read during a normal operation. The validation procedure will usually involve stopping the operation of the air pressure source 104 for a predefined time interval. This will be followed by reading data from sensor elements 148, and comparing the read data to normal operation. As for an example, when air pipe opening 176 is fully clear without any clog, the air trapped in air pipe 112 will evacuate from air pipe 112 during the validation procedure much quicker than in the case the air pipe opening 176 is partially clogged. By that controller 144 may alert the user on a possible problem with air pipe opening 176. Similarly by stopping air pressure source 104 and restarting it after a predefined time interval, the readings from sensor elements 148 are compared to the expected readings in normal operation elements, thus producing an alert when an abnormal condition within sensor elements 148 is detected.

Optionally a controlled air valve 180 can be added at the air pipe 112 inlet. In the case of blockage along air pipe 112, it can be used in combination with inlet pressure sensor 124 to check and estimate blockage position along air pipe 112. This can be achieved by the following the steps:
 a) Open air valve 180 to release trapped air from air pipe 112.
 b) Close air valve 180 and apply air into air pipe 112.
 c) Measure the time it takes to achieve maximal air pressure is achieved in air pipe 112.
 d) Estimate blockage position along air pipe 112, by air pipe 112 diameter and the time it took to achieve maximal air pressure, deducing from that the length of the blocked segment of air pipe 112.

In operation, air pressure source 104 applies air flow 108 into air pipe 112, the applied air flow 108 will exit from air flow outlet 120. Air pressure and air flow are measured constantly by sensors 124, 128, 132, and 136 at air flow inlet and air flow outlet locations. Similar measurement results showing similar air pressure levels measured by inlet pressure sensor 124 and by outlet pressure sensor 132, will indicate on normal operation of the fiber bundle 116. Similarly, equal flow intensity levels measured by inlet air flow sensors 128 and outlet air flow sensor 136 will indicate on normal operation as well.

Figure 2:
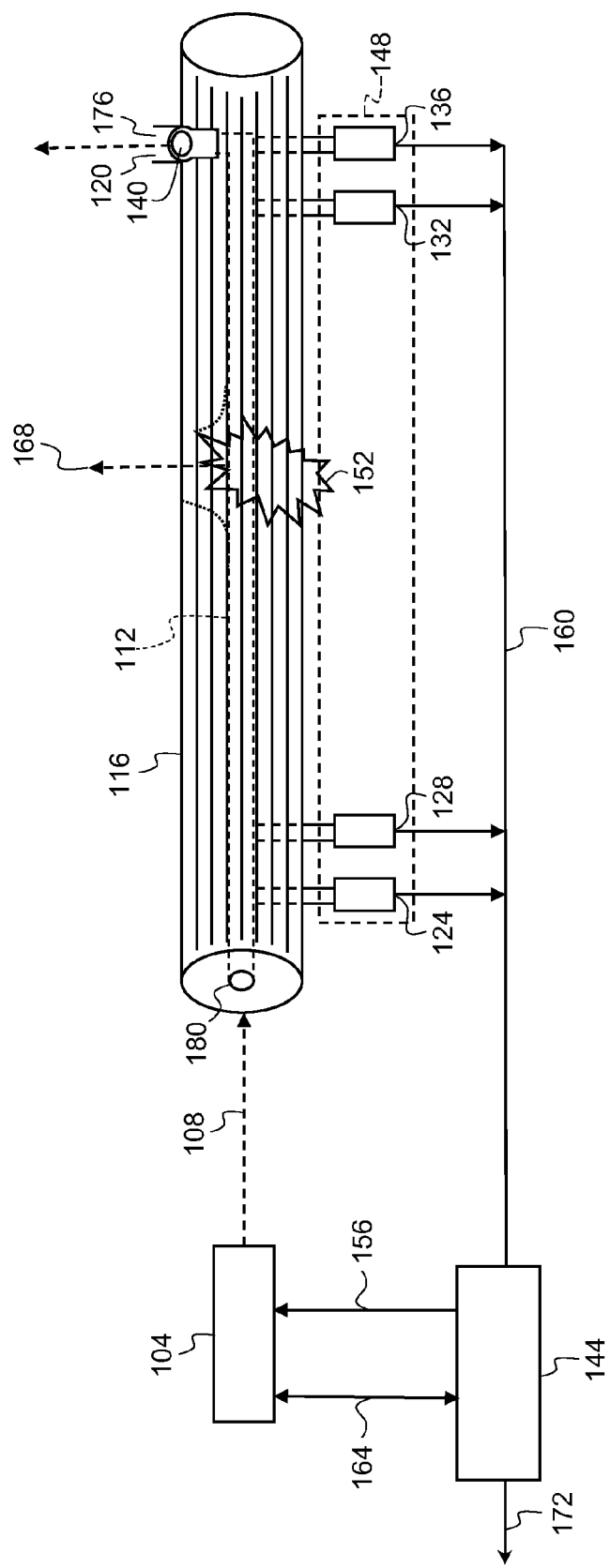
FIG. 2 is an illustration of a damaged air pipe inside a fiber bundle using air pressure and air flow sensors.

In the case of a hazardous event, such as excess of heat or fire, air pipe 112 can be damaged or destroyed as is indicated by the heat damaged area 152. In this case the air pressure inside the air pipe 112 may break the melting pipe causing air flow leakage 168, as is depicted in FIG. 2.

The hazardous situation described above will be detected by sensor element 148. In the event of a damage in air pipe 112 due to melting by fire, air flow 108 can be trapped between pipe inlet and heat damaged area 152, resulting in inlet pressure sensor 124 high pressure readings, whereas outlet pressure sensor 132 will show no pressure. In this case both air flow sensors (128, 136) will not read any air flow.

Alternatively, a hole can be created in heat damaged area 152 causing air flow 108 to exit from heat damaged area 152 and leak out 168 from the damaged air pipe 112. In this case the readings of air pressure sensor 124 will show significantly higher results than outlet pressure sensor 132. Similarly inlet air flow sensor 128 will show high values whereas outlet air flow sensor 136 will show almost no air flow. In this case inlet air pressure sensor 124 will read high pressure, and the outlet pressure sensor 132 will show low or no pressure.

The combination or variety of sensor elements 148 can differ between sensor configurations. For example a single air pressure sensor can be used at the outlet end of air pipe 112, and produce sufficient information on air pipe 112 status.

These readings will indicate an abnormal situation that should cause invoking an interlock to stop system operation, and produce an alert via alert line 172 to the user. Such an alert should be generated at any stage where pressure sensors (124, 132) read different values or the flow sensors (128, 136) read different values.

Figure 3:
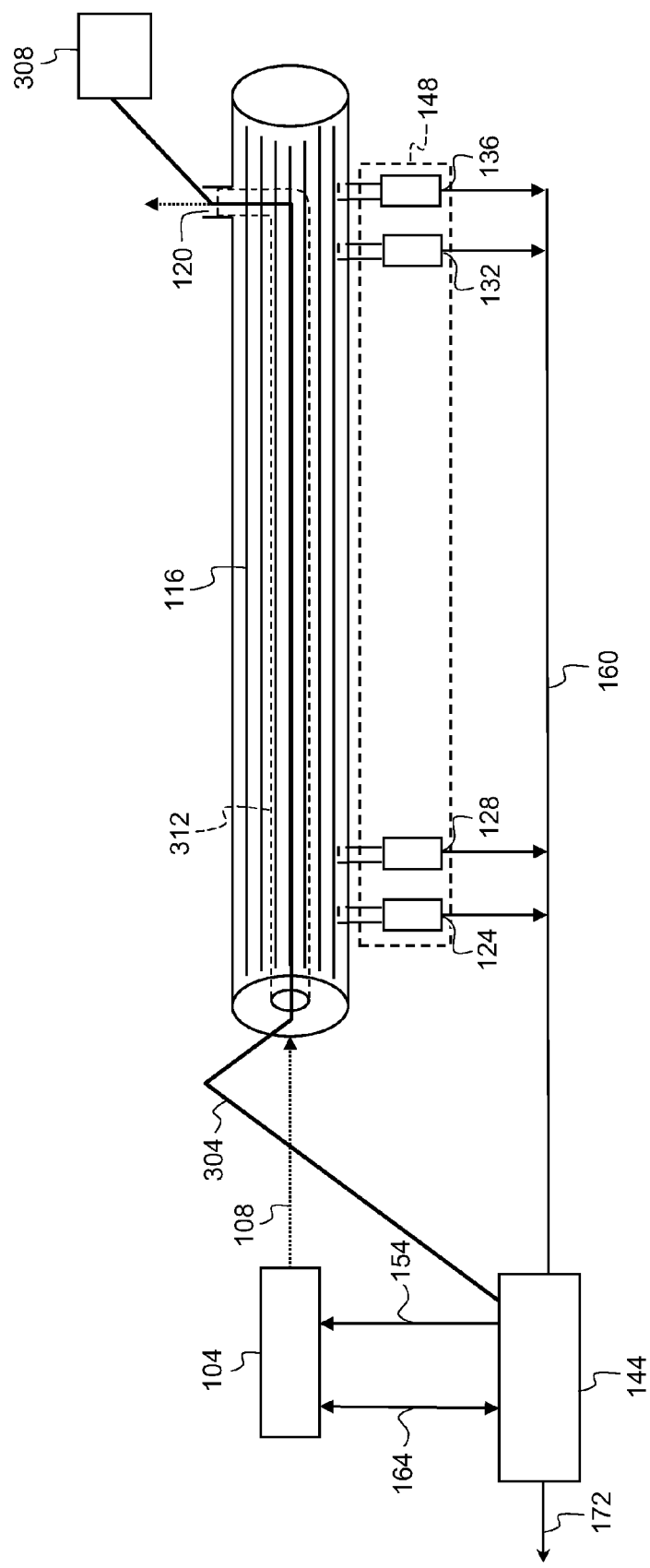
FIG. 3 is an illustration of an air pipe inside a fiber bundle with an electric wire inserted in the air pipe with air pressure and air flow sensors.
Figure 4:
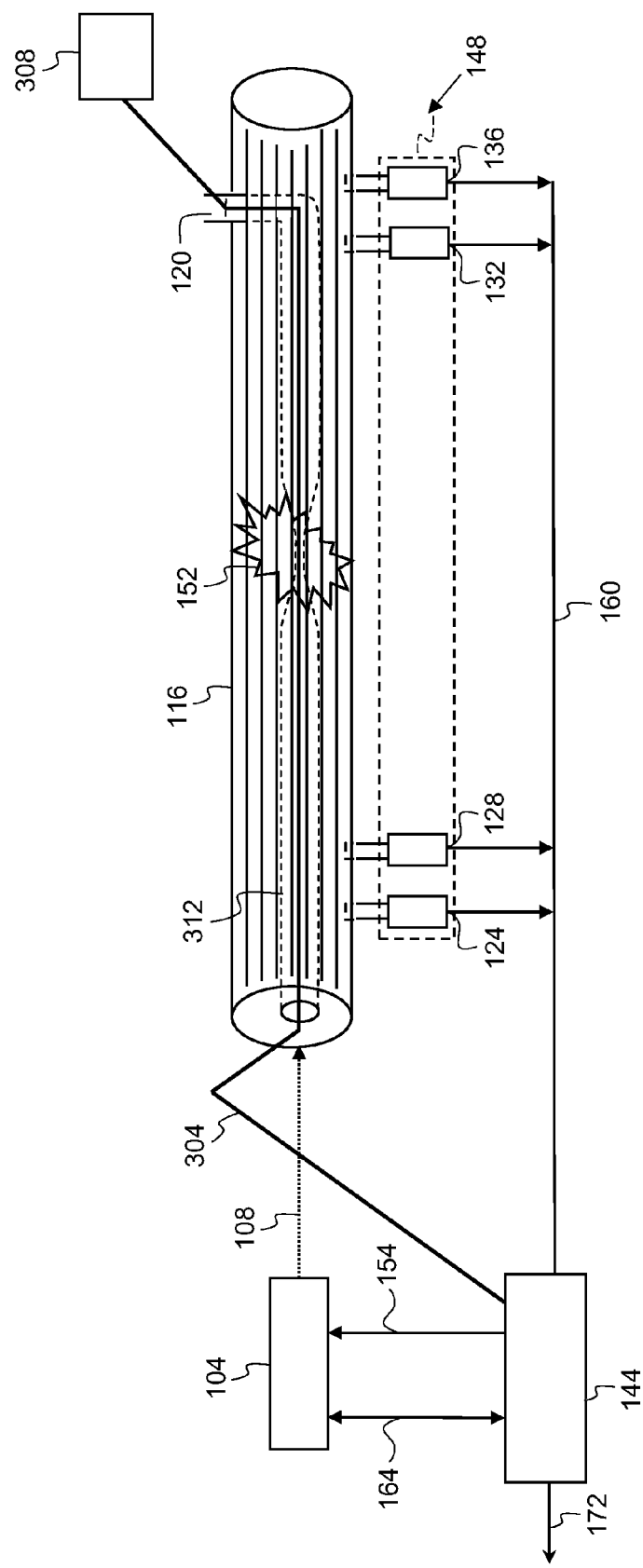
FIG. 4 is an illustration of a damaged air pipe inside a fiber bundle with an electric wire inserted in the air pipe with air pressure and air flow sensors.

FIG. 3 shows a shrinking air pipe sleeve 312. The shrinking air pipe sleeve 312 will shrink at predetermined temperatures. The sleeve is usually constructed from flexible material, and as such may bend during operation. Such a bend will cause a blockage in air pipe 112, and create false abnormal alarms. FIG. 3 shows an electric wire 304 inserted into air pipe 112. The electric wire 304 due to its rugged features will prevent from shrinking air pipe sleeve 312 to bend. In addition the electric wire will be connected to an interlock 308. In the case of a fire causing a damage in heat damaged area 152 (as is shown in FIG. 4), the electric wire will automatically set interlock 308, to stop laser imaging.

Figure 5:
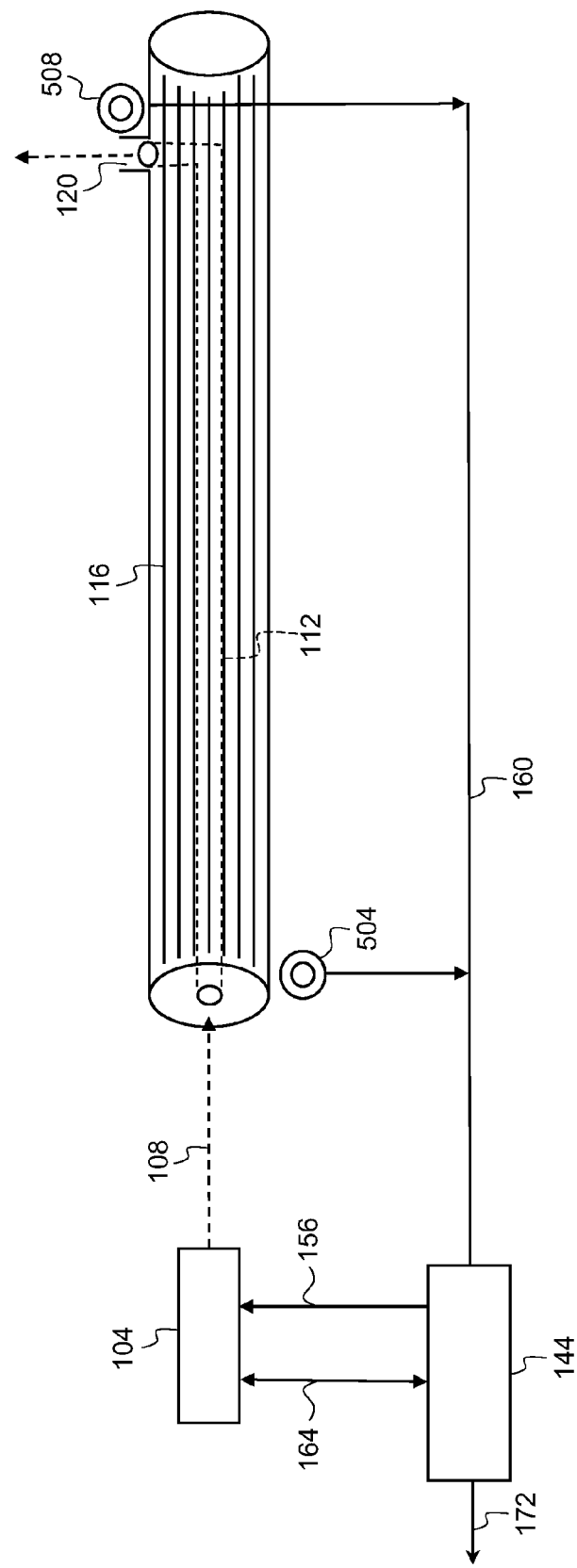
FIG. 5 is an illustration of an air pipe inside a fiber bundle with microphone sensors.

FIG. 5 shows microphone sensors 504, 508 can be used instead of air flow sensors and air pressure sensors. Microphone sensors can be placed in proximity to inlet and/or outlet of air pipe 112. The audio levels generated by the air flow are measured and translated into flow intensity terms, thus indicating the air flow levels. Similarly, measuring pressure oscillations generated by air flow turbulences can be used for air pressure measurement.

The invention has been described in detail with particular reference to certain preferred embodiments thereof, but it will be understood that variations and modifications can be effected within the scope of the invention.

PARTS LIST 104 air pressure source
108 air flow
112 air pipe
116 fiber bundle
120 air flow outlet
124 inlet pressure sensor
128 inlet air flow sensor
132 outlet pressure sensor
136 outlet air flow sensor
140 air flow regulator
144 controller
148 sensor element
152 heat damaged area
156 test validation signal
160 sensor data collection
164 control/status line between controller and air pressure source
168 air flow leakage
172 alert line
176 air pipe opening
180 air valve at the air pipe inlet
304 electric wire
308 interlock
312 shrinking air pipe sleeve
504 microphone sensor at inlet
508 microphone sensor at outlet

The invention claimed is:

1. An apparatus for alerting on an abnormal condition in a fiber optic bundle comprising:
 an air pipe inside of said fiber optic bundle;
 air compression element for supplying air to said air pipe;
 at least one sensor for detecting an abnormal condition in said air pipe; and
 an alert element configured to notify an abnormal measurements by said at least one sensor.

2. The apparatus according to claim 1 wherein said at least one sensor is an air flow sensor.

3. The apparatus according to claim 1 wherein said at least one sensor is an air pressure sensor.

4. The apparatus according to claim 1 wherein said air pipe is comprised of material with a predefined melting point.

5. The apparatus according to claim 1 wherein said abnormal condition is air leakage from said air pipe.

6. The apparatus according to claim 1 wherein said abnormal condition is a blockage in said air pipe.

7. A method for alerting on an abnormal condition in a fiber optic bundle comprising the steps of:
   applying air flow into an air pipe inside said fiber bundle;
   measuring air flow inside said air pipe with at least one sensor; and
   sending an alert signal on an abnormal measurements of said at least one sensor.

8. The method according to claim 7 wherein a second sensor detects air pressure in said air pipe.

9. An apparatus for detecting an abnormal condition in a fiber optic bundle comprising:
   an air pipe inside said fiber optic bundle;
   an air compressor for supplying air to said air pipe;
   a first pressure sensor and a first air flow sensor located at the inlet of said air pipe;
   a second pressure sensor and a second air flow sensor located at an outlet of said air pipe;
   a controller for comparing pressure and flow readings from said inlet and outlet pressure sensor and said inlet and outlet flow sensor; and
   wherein alert signal is sent on detection of an abnormal condition in said air pipe by said controller.

10. An apparatus according to claim 9 wherein an abnormal condition detected by any one of said sensors causes said controller to shut down lasers associated with said optical fibers.

11. An apparatus for alerting on an abnormal condition in a electrical cable bundle comprising:
    an air pipe inside of said electrical cable bundle;
    air compression element for supplying air to said air pipe;
    at least one sensor for detecting an abnormal condition in said air pipe; and
    an alert element configured to notify an abnormal measurements by said at least one sensor.

* * * * *